(12) United States Patent
Riedl et al.

(10) Patent No.: US 7,278,652 B2
(45) Date of Patent: Oct. 9, 2007

(54) FOLDABLE STROLLER

(76) Inventors: John Riedl, 37 E. Waterbury Dr., Springboro, OH (US) 45066; John K. Hay, 5457 Grand Legacy Dr., Maineville, OH (US) 45039; Thomas B. Remm, 1209 Capital Hill Dr., Milford, OH (US) 45150; John T. Schmidt, 1508 Creekside Rd., Amelia, OH (US) 45102

( * ) Notice: Subject to any disclaimer, the term of this patent is extended or adjusted under 35 U.S.C. 154(b) by 180 days.

(21) Appl. No.: 11/120,043

(22) Filed: May 2, 2005

(65) Prior Publication Data

US 2006/0006629 A1    Jan. 12, 2006

Related U.S. Application Data

(60) Provisional application No. 60/567,157, filed on Apr. 30, 2004.

(51) Int. Cl.
 *B62B 1/00*  (2006.01)
 *B62B 3/02*  (2006.01)

(52) U.S. Cl. ............... 280/642; 280/650; 280/47.38

(58) Field of Classification Search ............ 280/642, 280/643, 647, 648, 650, 656, 657, 801.1, 280/803, 807, 47.38; 297/353, 354.1, 361.1
See application file for complete search history.

(56) References Cited

U.S. PATENT DOCUMENTS

| | | | |
|---|---|---|---|
| 4,643,446 A | 2/1987 | Murphy et al. | |
| 4,685,688 A | 8/1987 | Edwards | |
| 4,707,024 A | 11/1987 | Schräder | |
| 4,725,253 A | 2/1988 | Politte | |
| 4,762,364 A | 8/1988 | Young | |
| 4,786,064 A | 11/1988 | Baghdasarian | |
| 4,805,928 A | 2/1989 | Nakao et al. | |
| 4,822,064 A | 4/1989 | Hunter | |
| 4,854,607 A | 8/1989 | Mandracchia et al. | |
| 4,856,809 A | 8/1989 | Kohus et al. | |
| 5,071,146 A | 12/1991 | Lewis et al. | |
| 5,149,115 A | 9/1992 | Sampedro | |
| 5,195,770 A * | 3/1993 | Ishikura | 280/648 |
| 5,201,535 A | 4/1993 | Kato et al. | |
| 5,354,121 A | 10/1994 | Allum | |
| 5,375,869 A | 12/1994 | Hsiao | |

(Continued)

*Primary Examiner*—Christopher P. Ellis
*Assistant Examiner*—Brian Swenson
(74) *Attorney, Agent, or Firm*—Thompson Hine LLP

(57) ABSTRACT

A stroller including two rear legs, two arms, wherein a first one of the arms is pivotally connected to a first one of the rear legs by a first latch mechanism and a second one of the arms is pivotally connected to a second one of the rear legs by a second latch mechanism, each of the latch mechanisms being adapted to releasably lock an associated one of the arms in a position with respect to an associated one of the rear legs, a handlebar portion having a first end and a second end, wherein the first end of the handlebar portion is pivotally connected to a first one of the arms and the second end of the handlebar portion is pivotally connected to a second one of the arms, and a single release mechanism positioned on the handlebar portion, wherein the single release mechanism is connected to each of the first and second latch mechanisms and is adapted to release the first and second latch mechanisms to allow pivotal movement of the arms relative to the rear legs.

11 Claims, 20 Drawing Sheets

U.S. PATENT DOCUMENTS

| | | | |
|---|---|---|---|
| 5,382,074 A | 1/1995 | Pietra | |
| 5,393,122 A | 2/1995 | Andrisin, III | |
| 5,445,433 A | 8/1995 | Avihod | |
| 5,490,685 A | 2/1996 | Kitayama et al. | |
| 5,590,896 A | 1/1997 | Eichhorn | |
| 5,687,985 A | 11/1997 | Sack | |
| 5,738,410 A | 4/1998 | Stroud et al. | |
| 5,741,021 A | 4/1998 | Saint et al. | |
| 5,749,627 A * | 5/1998 | Perego | 297/370 |
| 5,769,431 A | 6/1998 | Cordova | |
| 5,769,447 A | 6/1998 | Huang | |
| 5,772,235 A | 6/1998 | Espenshade | |
| 5,772,279 A | 6/1998 | Johnson, Jr. | |
| 5,788,604 A | 8/1998 | Brown et al. | |
| 5,794,951 A | 8/1998 | Corley et al. | |
| 5,806,877 A | 9/1998 | Huang | |
| 5,816,648 A | 10/1998 | Baccili et al. | |
| 5,823,547 A | 10/1998 | Otobe et al. | |
| 5,833,261 A | 11/1998 | Brown et al. | |
| 5,845,924 A | 12/1998 | Huang | |
| 5,855,384 A | 1/1999 | Pike et al. | |
| 5,876,046 A | 3/1999 | Courtney et al. | |
| 5,899,467 A | 5/1999 | Henkel | |
| 5,934,757 A | 8/1999 | Smith | |
| 5,938,229 A | 8/1999 | Chen et al. | |
| 5,947,555 A | 9/1999 | Welsh, Jr. et al. | |
| 5,961,018 A | 10/1999 | Abelbeck et al. | |
| 5,961,133 A | 10/1999 | Perry | |
| 5,988,657 A | 11/1999 | Henkel | |
| 6,017,088 A | 1/2000 | Stephens et al. | |
| 6,027,001 A | 2/2000 | Levitan | |
| 6,036,221 A | 3/2000 | Yang | |
| 6,068,284 A | 5/2000 | Kakuda | |
| 6,095,613 A | 8/2000 | Ostrander et al. | |
| 6,095,614 A | 8/2000 | Canna et al. | |
| 6,129,373 A * | 10/2000 | Cheng | 280/647 |
| 6,139,046 A | 10/2000 | Aalund et al. | |
| 6,155,740 A | 12/2000 | Hartenstine | |
| 6,241,273 B1 | 6/2001 | Gehr | |
| 6,241,313 B1 | 6/2001 | Lenz et al. | |
| 6,247,755 B1 | 6/2001 | Canna et al. | |
| 6,273,451 B1 | 8/2001 | Julien et al. | |
| 6,286,844 B1 | 9/2001 | Cone, II et al. | |
| 6,302,412 B1 | 10/2001 | Worth et al. | |
| 6,322,097 B1 | 11/2001 | Lan | |
| 6,322,098 B1 | 11/2001 | Lan | |
| 6,363,558 B1 | 4/2002 | Dunne | |
| 6,367,875 B1 | 4/2002 | Bapst | |
| 6,409,205 B1 | 6/2002 | Bapst et al. | |
| 6,471,222 B1 | 10/2002 | Hsia | |
| 6,478,327 B1 | 11/2002 | Hartenstine et al. | |
| 6,494,479 B1 | 12/2002 | Cheng | |
| 6,550,801 B1 | 4/2003 | Newhard | |
| 6,572,134 B2 | 6/2003 | Barrett et al. | |
| 6,595,583 B2 | 7/2003 | Hou | |
| 6,641,078 B2 * | 11/2003 | Palliser | 242/382.2 |
| 6,641,164 B2 | 11/2003 | Wood et al. | |
| 6,655,702 B2 | 12/2003 | Senger | |
| 6,666,473 B2 | 12/2003 | Hartenstine et al. | |
| 6,702,316 B2 | 3/2004 | Hsia | |
| 6,729,630 B2 | 5/2004 | Szmidt et al. | |
| 6,733,018 B2 | 5/2004 | Razon | |
| 6,802,514 B2 | 10/2004 | Worth et al. | |
| 6,830,254 B2 * | 12/2004 | Lan | 280/47.4 |
| 6,834,915 B2 | 12/2004 | Sedlack | |
| 6,863,286 B2 | 3/2005 | Eros et al. | |
| 6,893,040 B2 | 5/2005 | Hou et al. | |
| 6,908,100 B2 * | 6/2005 | Kassai et al. | 280/642 |
| 6,923,467 B2 | 8/2005 | Hsia | |
| 6,938,915 B2 | 9/2005 | Bischoff et al. | |
| 7,021,650 B2 * | 4/2006 | Chen | 280/642 |

\* cited by examiner

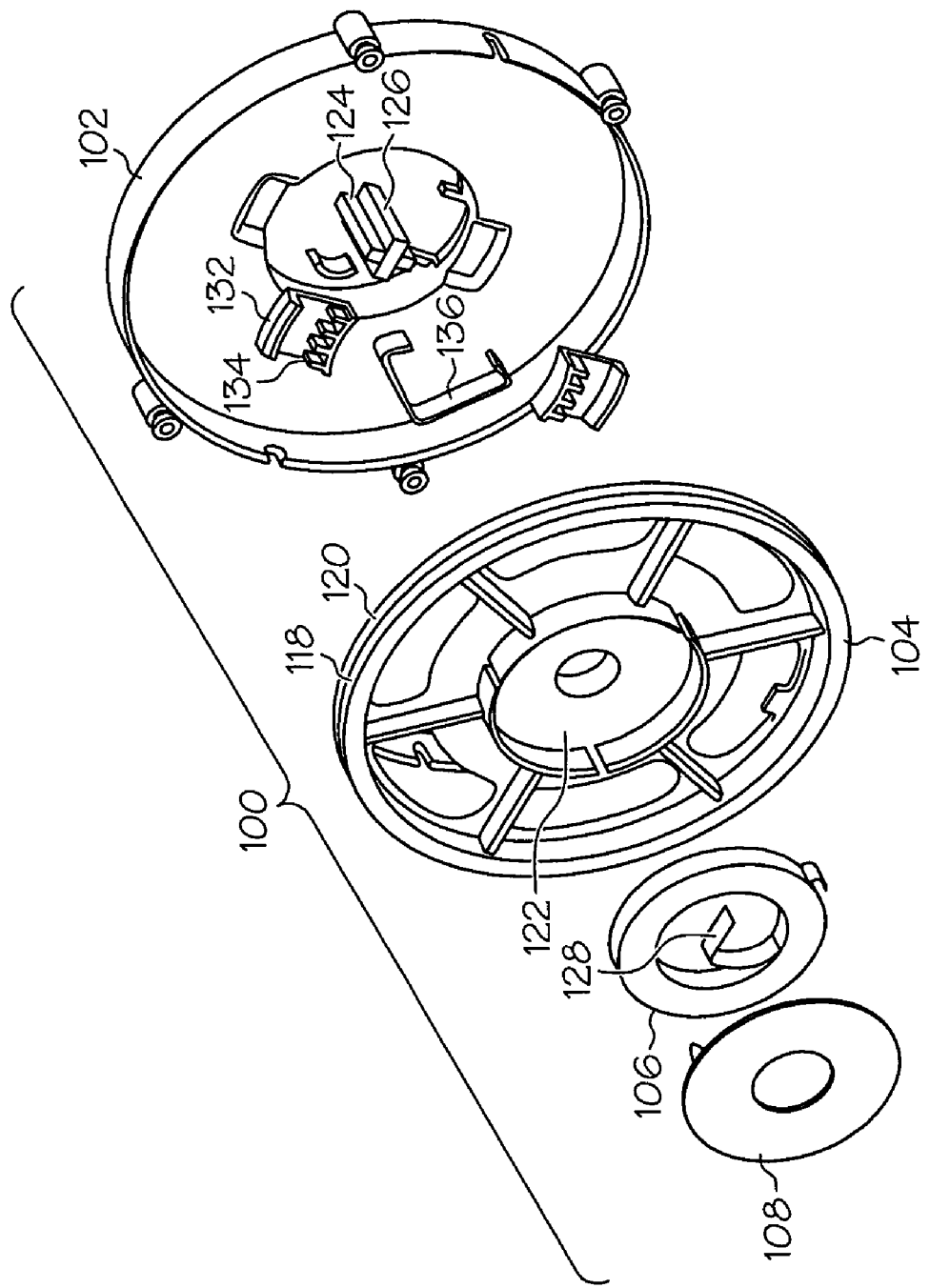

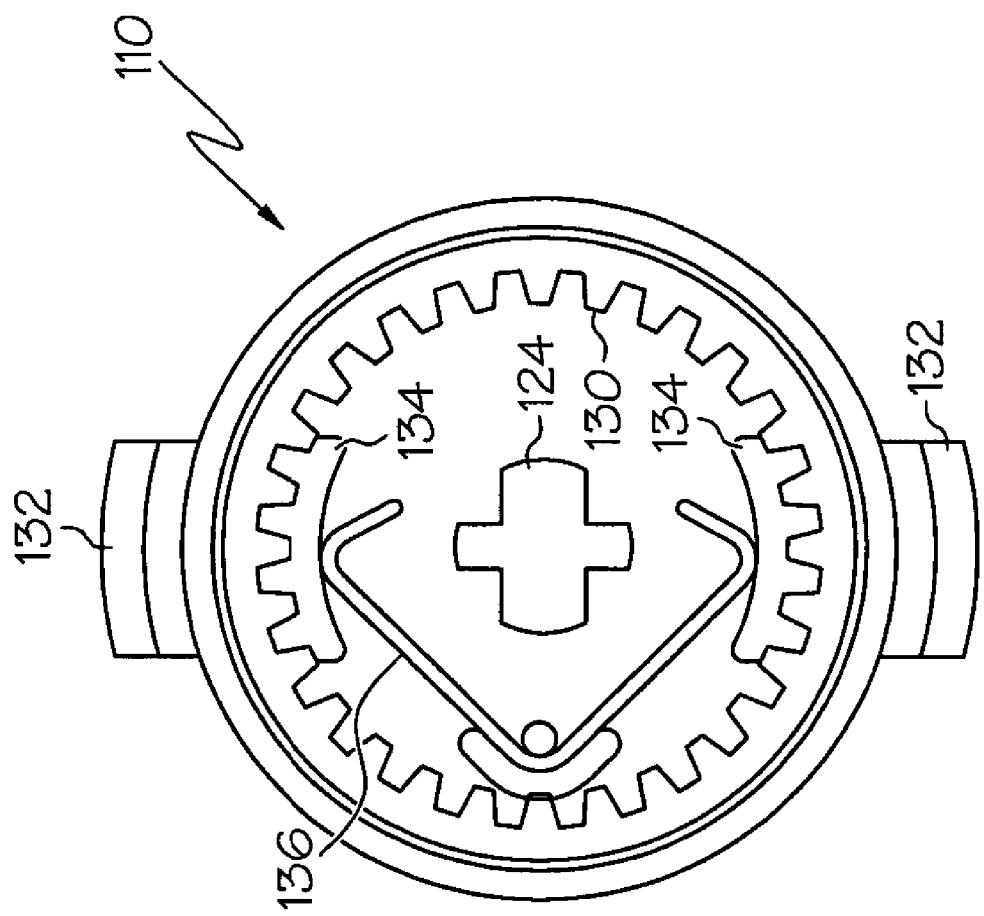

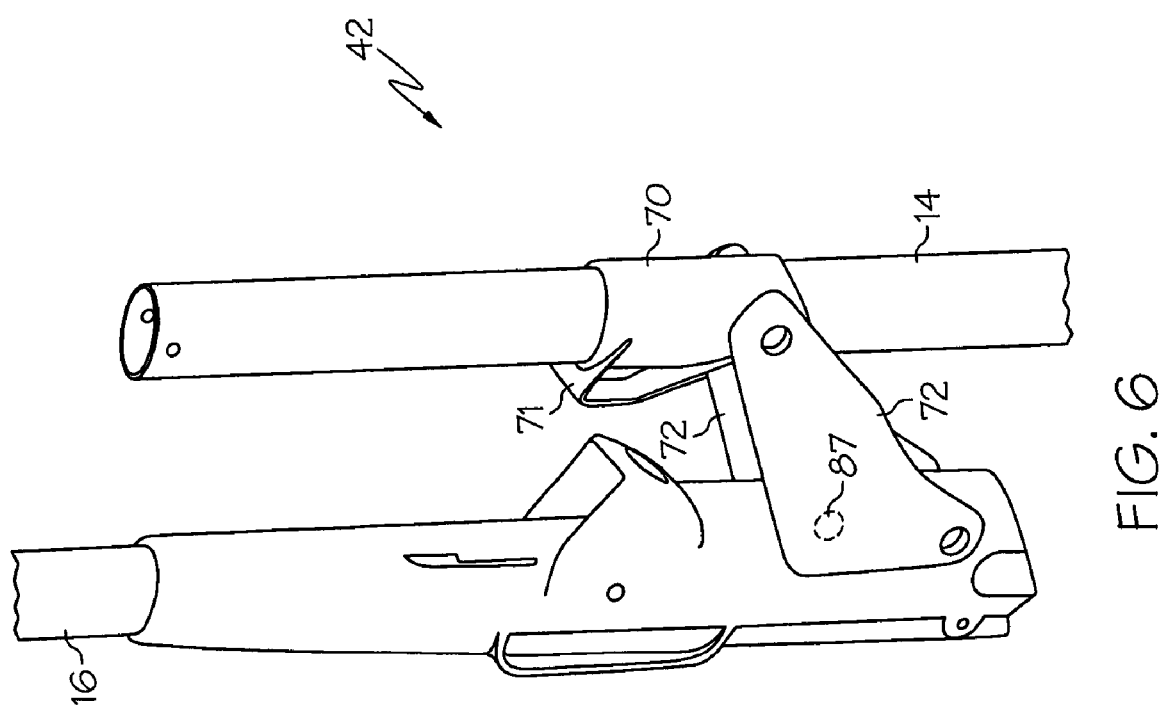

FOLDABLE STROLLER

This application claims priority from U.S. Provisional Patent App. No. 60/567,157 filed on Apr. 30, 2004, the entire contents of which are incorporated herein by reference.

BACKGROUND

The present application relates to devices for transporting children and, more particularly, to strollers Over the years strollers have advanced to include various improved features. For example, modern strollers may be foldable.

Prior art foldable strollers often have several disadvantages in terms of use, storage and manufacture. In particular, prior art foldable strollers are often heavy and difficult to fold and unfold.

Thus, it may be desirable to provide a stroller that may be folded such that it may be stored or carried with ease. Furthermore, it may be desirable to provide a stroller that may be converted into a carriage-type stroller having a seat that may be adjusted from an inclined position to a horizontal position. Furthermore, it may be desirable to provide means for securing a car seat to the stroller. Furthermore, it may be desirable to provide a basket on the stroller for storing various items. Furthermore, it may be desirable to provide a canopy on the stroller for shading an occupant in the seating compartment from harmful sun rays. Furthermore, it may be desirable to provide a harness on the stroller for securing infants and children to the stroller.

Accordingly, there is a need for a foldable stroller that overcomes at least some of disadvantages of prior art strollers.

SUMMARY

A first aspect of the foldable stroller provides a stroller including two rear legs, two arms, wherein a first one of the arms is pivotally connected to a first one of the rear legs by a first latch mechanism and a second one of the arms is pivotally connected to a second one of the rear legs by a second latch mechanism, each of the latch mechanisms being adapted to releasably lock an associated one of the arms in a position with respect to an associated one of the rear legs, a handlebar portion having a first end and a second end, wherein the first end of the handlebar portion is pivotally connected to a first one of the arms and the second end of the handlebar portion is pivotally connected to a second one of the arms, and a single release mechanism positioned on the handlebar portion, wherein the single release mechanism is connected to each of the first and second latch mechanisms and is adapted to release the first and second latch mechanisms to allow pivotal movement of the arms relative to the rear legs.

In another aspect, the foldable stroller provides a stroller including two arms, a seat back portion positioned between the arms and a reclining mechanism connected to the seat back portion, wherein the reclining mechanism includes at least one spring-loaded cable extending therefrom and fixedly connected to an associated one of the arms, wherein the cable is adapted to retractably extend from the reclining mechanism to adjust an angle of the seat back relative to the arms.

In another aspect, the foldable stroller provides a stroller including a frame, the frame including at least one arm and at least two legs, a seat portion connected to the frame and a seatbelt retractor, the seatbelt retractor including a spring-loaded seatbelt therein, wherein the seatbelt retractor is connected to the frame and/or the seat portion.

In anther aspect, the foldable stroller provides a stroller including a frame, the frame including at least two arms and at least two legs, a seat portion connected to the frame, a seat back portion positioned between the arms and pivotally connected to the seat portion, a reclining mechanism connected to the seat back portion, wherein the reclining mechanism includes two spring-loaded cables extending therefrom, each of the cables being fixedly connected to an associated one of the arms, each of the cables being adapted to retractably extend from the reclining mechanism to adjust an angle of the seat back portion relative to the seat portion, and a seatbelt retractor having a spring-loaded seatbelt therein, wherein the seatbelt retractor is connected to the frame, the seat portion and/or the seat back portion.

Other aspects of the foldable stroller provide a stroller with an improved means for attaching an infant or child car seat to the stroller, an improved canopy for providing protection from harmful sun rays, an improved storage basket on the stroller for storing various items, and an improved harness for securing infants and children to the stroller.

Other objects and advantages of the present invention will be apparent from the following description, the accompanying drawings and the appended claims.

BRIEF DESCRIPTION OF THE DRAWINGS

FIG. 3A is an exploded perspective view of a reclining mechanism of the foldable stroller of FIG. 1;

FIG. 3B is a front elevation view, in cross section, of the recline mechanism of FIG. 3A;

FIG. 6 is a side perspective view of the latch assembly in FIG. 5A in a folded position;

DETAILED DESCRIPTION

Figure 1:
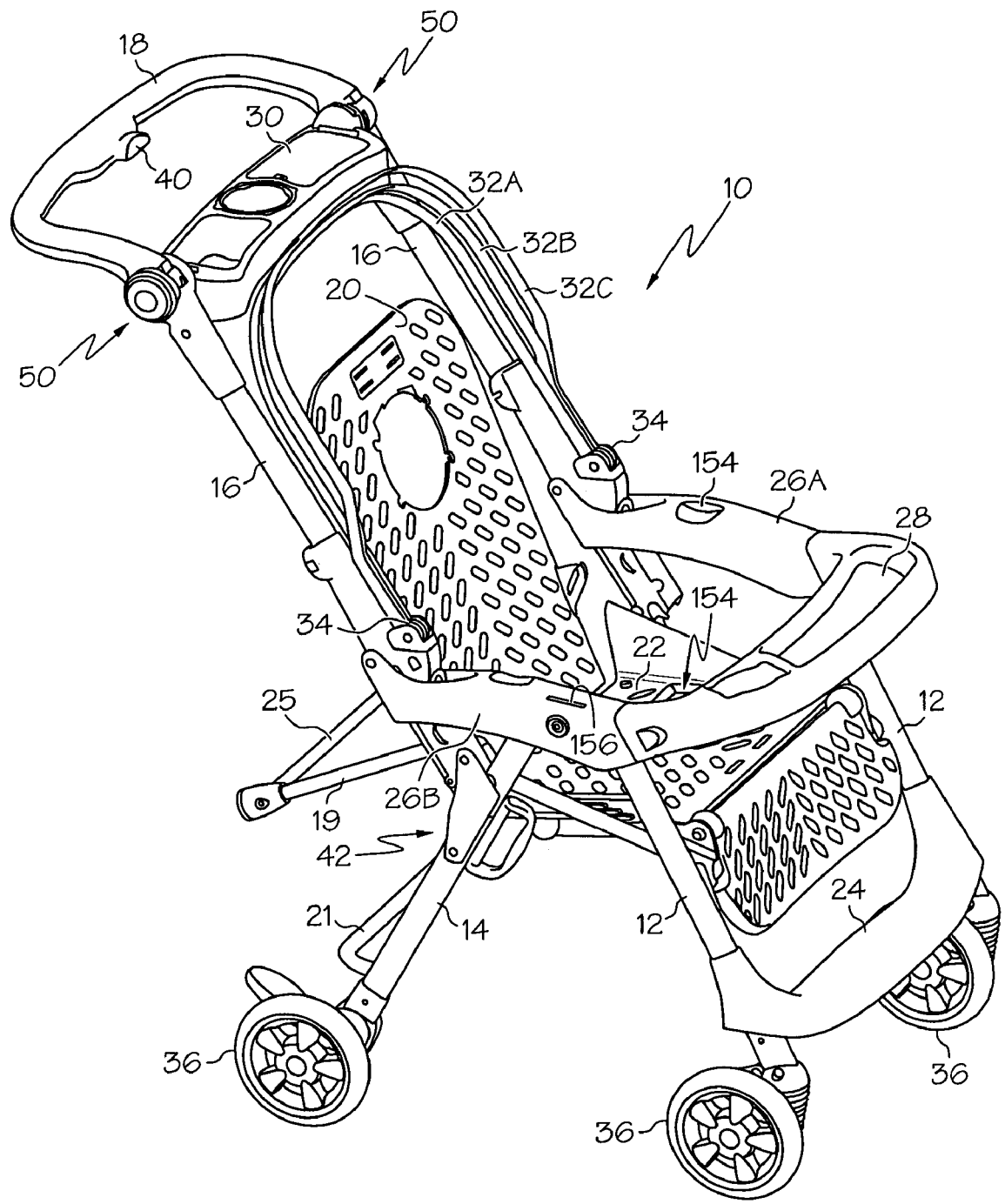
FIG. 1 is a side perspective view of one aspect of the foldable stroller.

As shown in FIG. 1, a first aspect of the foldable stroller, generally designated 10, includes two front legs 12, two rear legs 14 (only one shown in FIG. 1), two arms 16, a handlebar 18, two handlebar joints 50, two support bars 19 (only one shown in FIG. 1), a seat back 20, a seat 22, a foot rest 24, armrests 26A and 26B, a child's tray 28, a handlebar tray 30, three canopy hoops 32A, 32B, 32C, two canopy hoop joints 34, four wheels 36 (only three shown in FIG. 1), two latch mechanisms 42 (only one shown in FIG. 1) and a lower crossbar 21.

In one aspect, the stroller 10 may include a one-hand (one-button) folding and unfolding mechanism. Referring to FIGS. 1 and 4-8, and specifically to FIG. 4, the one-hand folding and unfolding mechanism may include a button 40 positioned on the handlebar 18, two cables 44 extending through the two arms 16 (only one shown in FIG. 4), and two latch mechanisms 42 connected between the two rear legs 14 and two arms 16 (see FIG. 5B). A first end 52 of each cable 44 is connected to the button 40, as shown in FIG. 8, and a second end 54 of each cable is connected to the latch mechanism 42, as shown in FIG. 5C.

The button 40 may be spring loaded (not shown) in the handlebar 18 and may be biased to extend out of the handlebar 18. The handlebar 18 may includes two outer posts 58 and two inner posts 60 for directing the two cables 44. As the cables 44 enter the handlebar 18, they are directed past a distal end 59 of outer posts 58 and a proximal end 61 of inner posts 60 and connect to the button 40 near the inner posts 60, as shown in FIG. 8. Therefore, as button 40 is depressed in the direction shown by arrow A, against the bias of the button spring (not shown), the two cables 44 may be drawn into the handlebar 18 in the direction shown by arrows B. As a result, the second ends 54 of the cables 44 may be urged in the direction shown by arrow C (FIG. 5C), thereby actuating the latching mechanism 42.

Figure 5A:
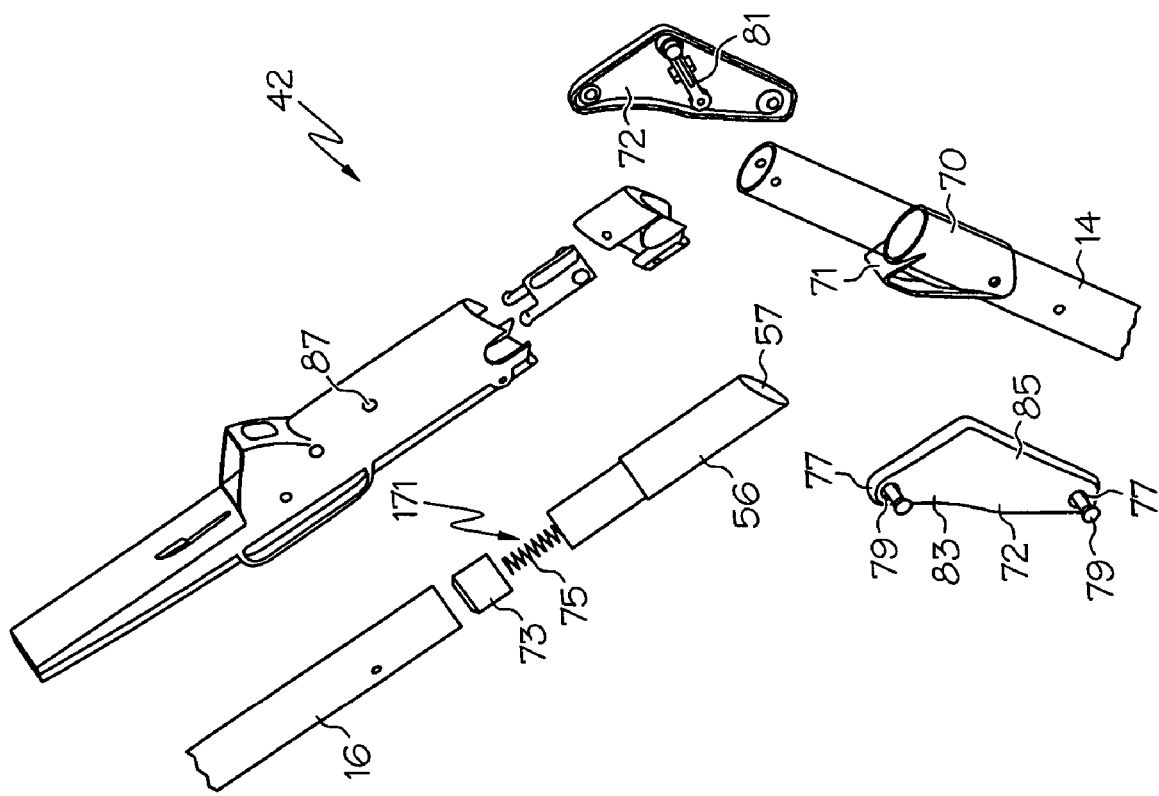
FIG. 5A is an exploded, perspective view of a latch assembly of the foldable stroller of FIG. 1.
Figure 5C:
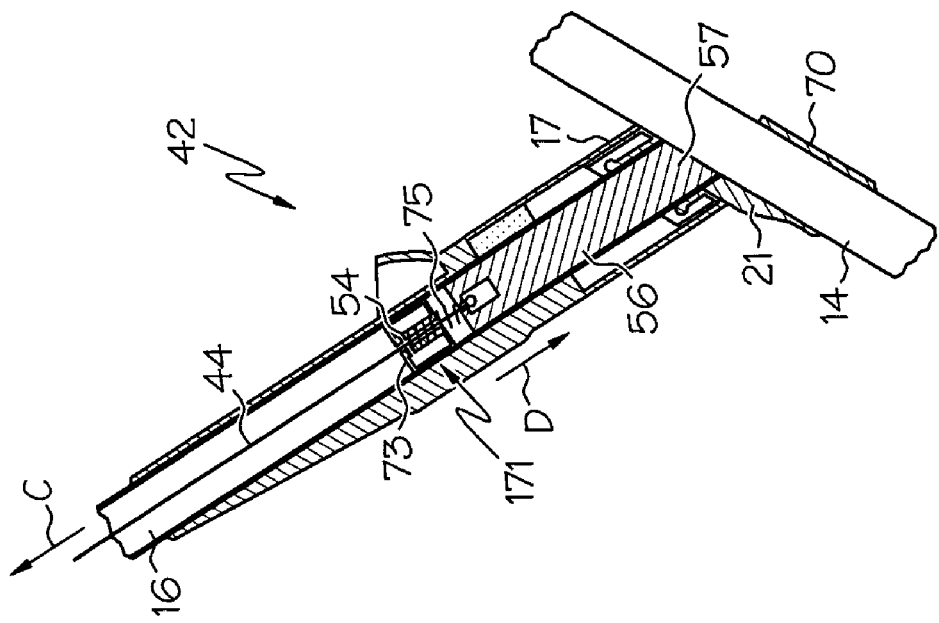
FIG. 5C is a side elevational view, in cross section, of the latch assembly of FIG. 5A.

The two latch mechanisms 42 (one for each side of the stroller 10), shown in greater detail in FIGS. 5A, 5B, 5C and 6, may connect the two rear legs 14 to the two arms 16 for locking the stroller in either the unfolded or folded position. Each latch mechanism 42 may include a plunger 56, a plunger biasing assembly 171, a stop 70 and two connecting plates 72. The plunger 56 may be coaxially received within distal end 17 of arm 16 and may be connected to the second end of cable 44. The plunger biasing assembly 171 may include a stop plate 73 and a spring 75. The second end 54 of cable 44 may be received through the stop plate 73 and spring 75 and may be connected to the plunger 56. The stop plate 73 may prevent movement of the plunger 56 past the stop plate 73 and the spring 75 may bias the plunger 56 in the direction shown by arrow D such that a distal end 57 of plunger 56 extends out of the distal end 17 of arm 16, as shown in FIG. 5C.

Figure 5B:
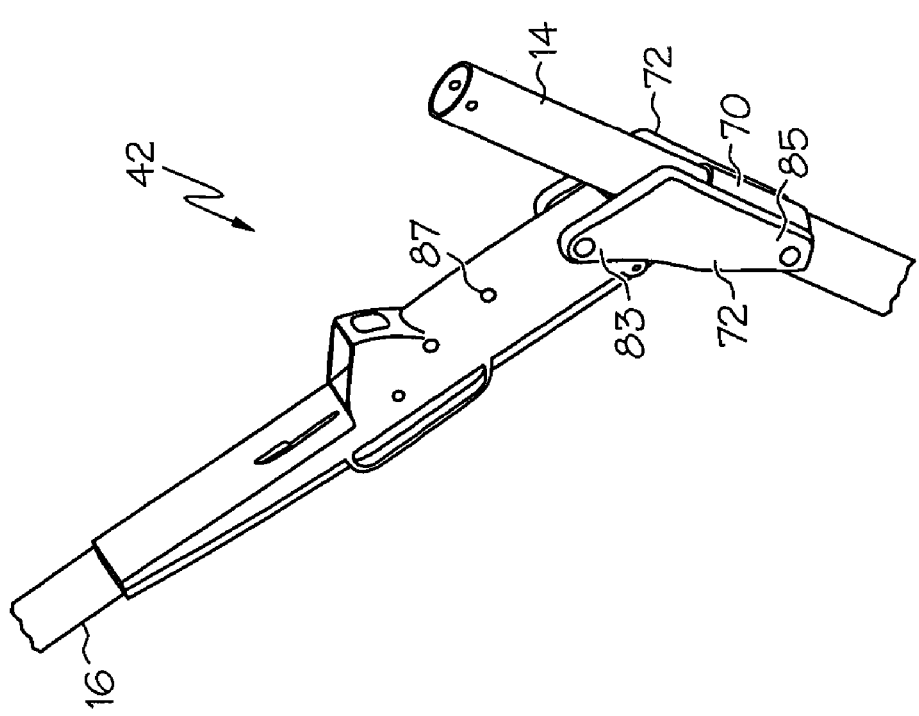
FIG. 5B is a side perspective view of the latch assembly of FIG. 5A in an unfolded position.

The stops 70 may be fixedly connected to the rear legs (one shown in FIG. 5A) and may include a flange surface 71 for engaging the distal end 57 of plunger 56 to lock the stroller 10 in the unfolded position, as shown in FIGS. 5B and 5C.

The connecting plates 72 each may include two holes 77 for receiving fastening devices 79, such as screws, bolts or the like, and a spring-loaded detent 81 for engaging holes or stops 87 (see FIG. 5A) in the distal end 17 of arm 16 for locking the stroller 10 in the folded position, as shown in FIG. 6. As shown in FIGS. 5B and 6, two connecting plates 72 may be attached at each latch mechanism 42 by connecting a first end 83 to the distal end 17 of arm 16 and a second end 85 to the rear leg 14 using the fastening devices 79. When the stroller 10 is folded, as shown in FIG. 6, the spring-loaded detents 81 on the connecting plates 72 (see FIG. 5A) engage the stops 87 on the arm 16, thereby locking the stroller 10 in the folded position.

Accordingly, when button 40 is depressed and urges the second end 54 of the cable 44 in the direction shown by arrow C, as discussed above, the plunger 56 may also be urged in the direction of arrow C and may therefore be withdrawn into arm 16. As the plunger 56 is withdrawn into arm 16, the distal end 57 of plunger 56 may clear the flange surface 71 of stop 70, thereby allowing the arm 16 to move relative to the rear leg 14 allowing the stroller 10 fold. Also, when the stroller is in the folded position, as the plunger 56 is withdrawn into the arm 16, the plunger urges the spring loaded detent 81 out of stops 87, thereby allowing the stroller 10 to be unfolded.

Figure 4:
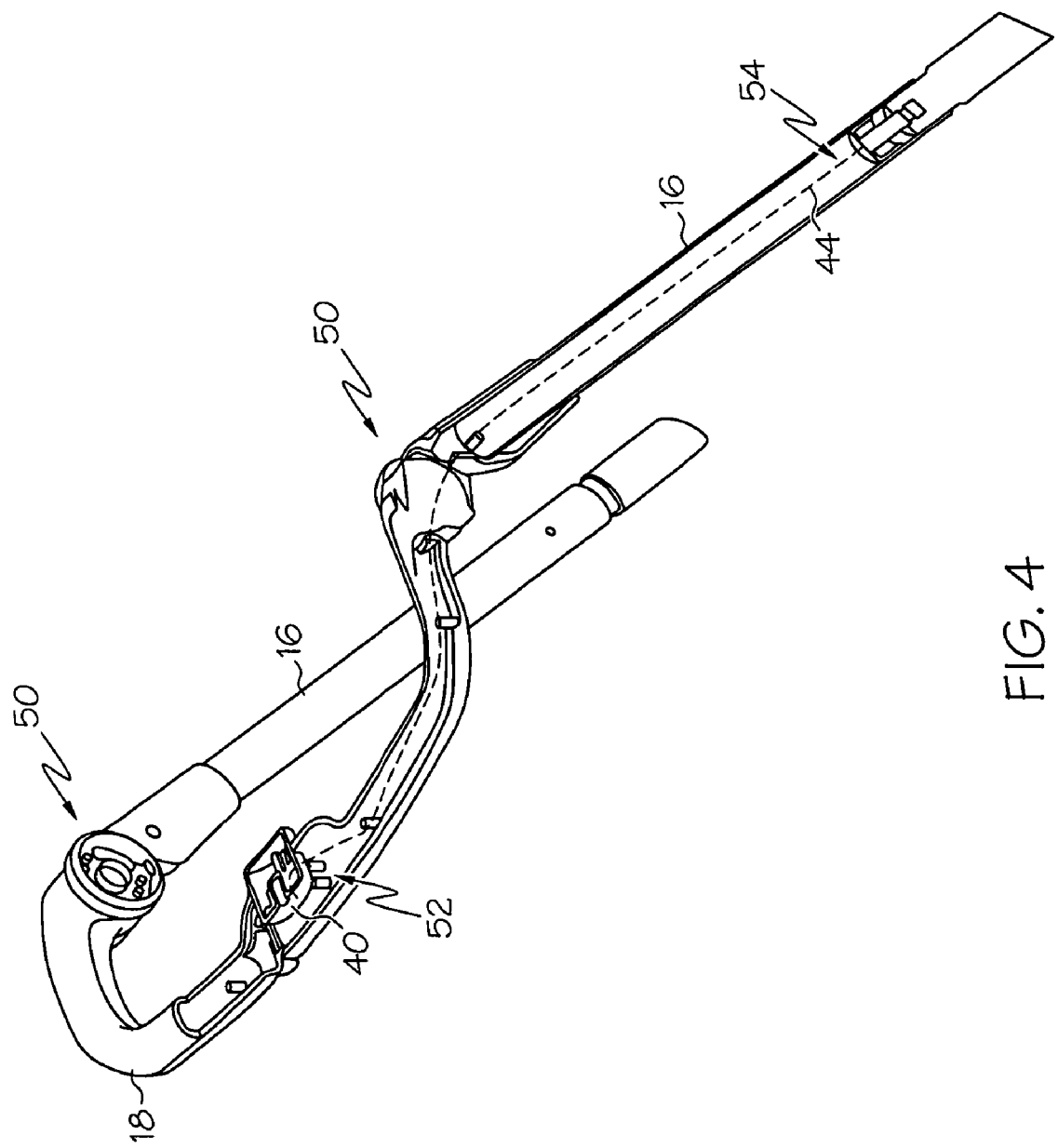
FIG. 4 is a side perspective view, partially in section, of a handlebar and arms of the foldable stroller of FIG. 1.
Figure 7A:
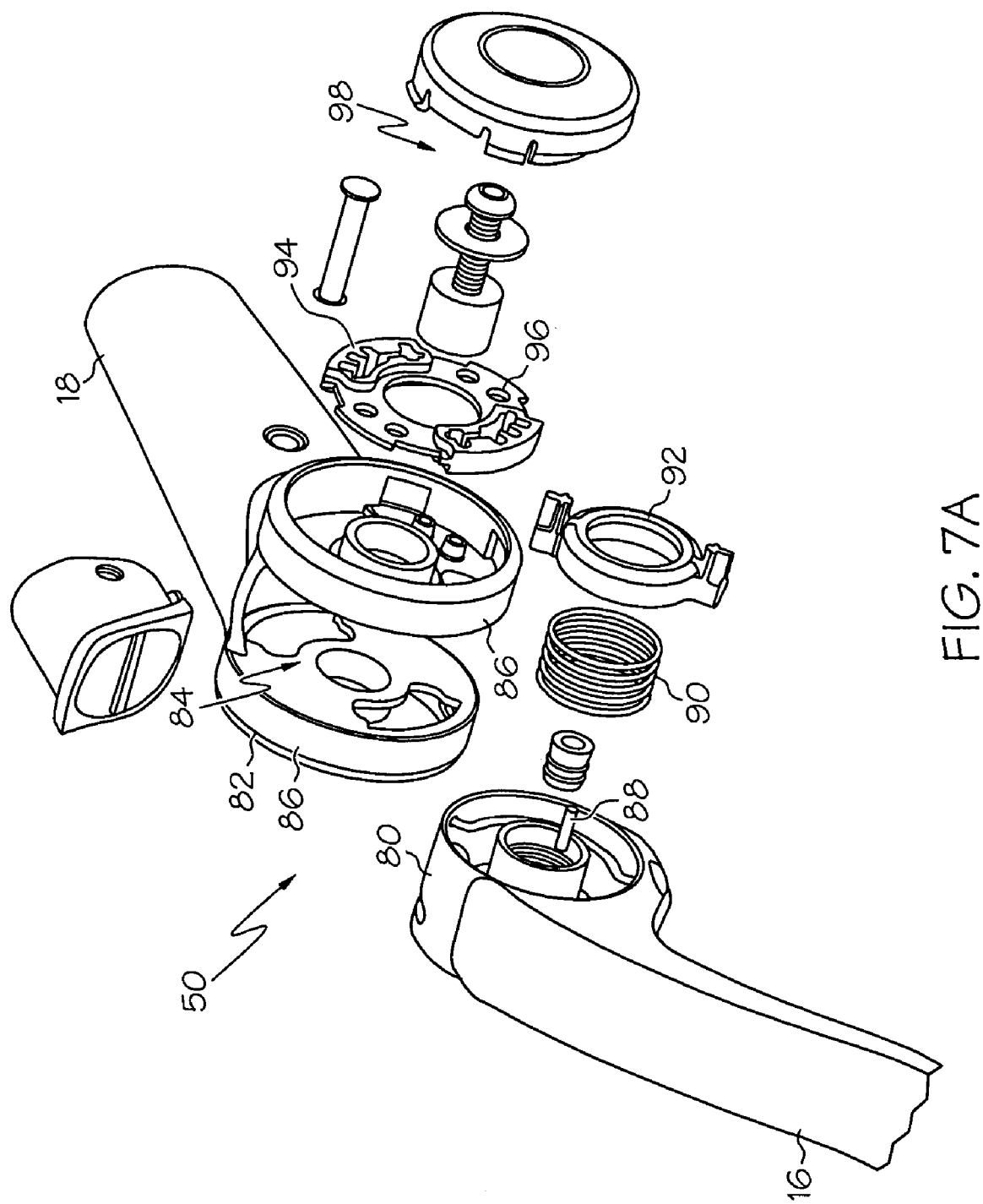
FIG. 7A is an exploded, perspective view of a handlebar joint of the foldable stroller of FIG. 1.
Figure 7B:
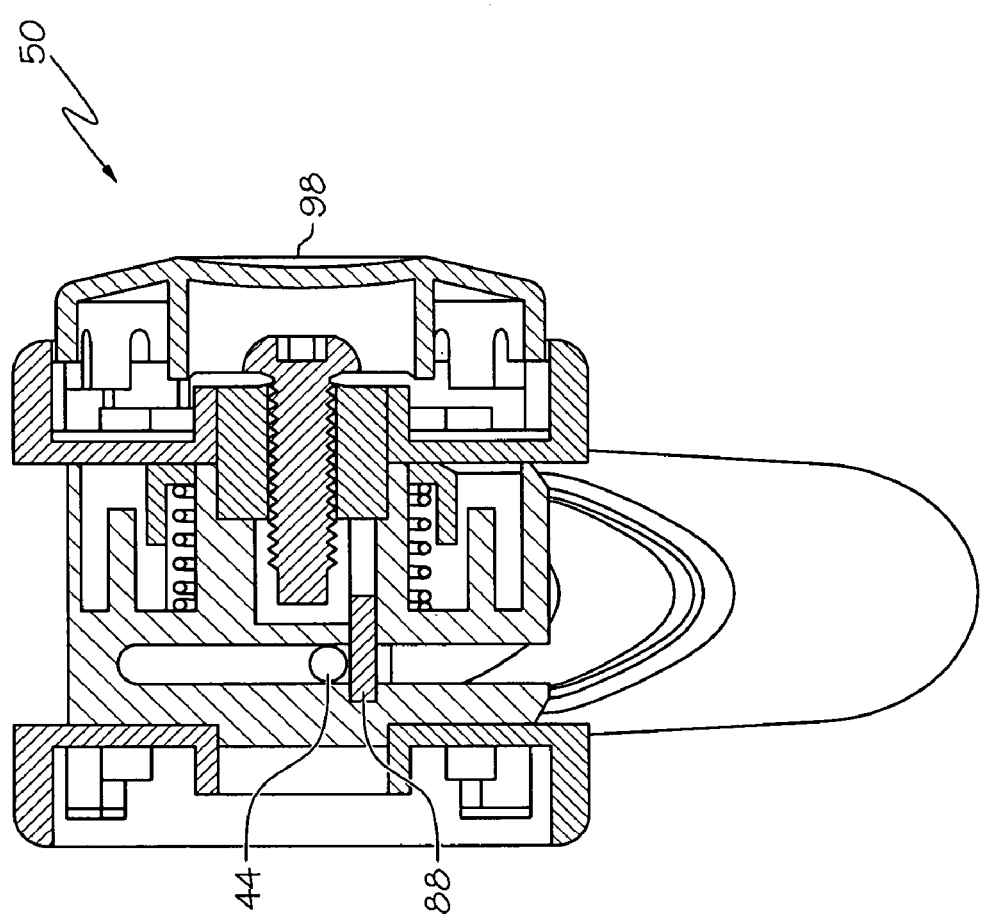
FIG. 7B is a top elevational view, in cross section, of the joint of FIG. 7A.
Figure 8:
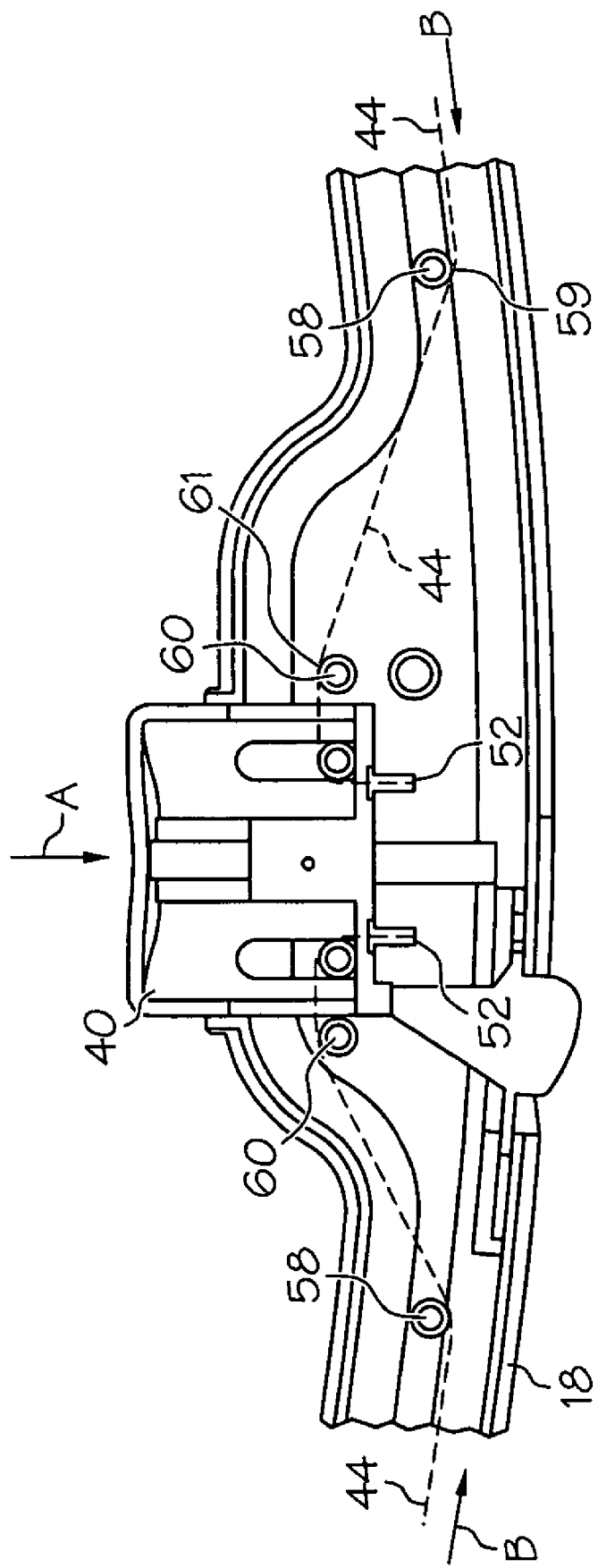
FIG. 8 is a top elevational view, in cross section, of the handlebar of FIG. 4.

As shown in FIGS. 4, 7A and 7B, the handlebar 18 may include two handlebar joints, generally designated 50, for allowing the handlebar 18 to rotate relative to the arms 16 while maintaining the cables 44 taut. Each joint 50 (only one being shown in FIGS. 7A and 7B, it being understood that the other is of identical construction) includes a first portion 80 connected to the arm 16 of the stroller and a second portion 82 connected to the handlebar 18 and having a recess 84 between two plates 86 for receiving the first portion 80. The first portion 80 includes a pin 88, a coil spring 90 and a locking ring 92 positioned within the first portion 80 such that when the first portion 80 is inserted into the recess 84, the locking ring 92 extends through plate 86 due to the bias of spring 90 and may be received within a slot 94 of slotted ring 96. Slotted ring 96 includes several slots 94, each of which corresponds to a different angle the handlebar 18 may make relative to the arms 16.

A button assembly 98 may be positioned on the joint 50 such that, when the button assembly 98 is actuated, the locking ring 92 may be withdrawn from the slots 94 of the slotted ring 96, thereby allowing the handlebar 18 to be rotated. When the button assembly 98 is released, the force of spring 90 urges the locking ring 92 back into a certain slot 94 in slotted ring 96, thereby fixing the handlebar 18 at a specific angle.

The pin 88 may be fixedly attached to the first portion 80 such that as the cable 44 moves through the joint assembly 50, the cable rests on top of the pin 88, as shown in FIG. 7B. As the angle of the handlebar 18 is adjusted at the joint 50, the position of the pin 88 relative to the second portion 82 changes, thereby absorbing the slack created in cable 44 as the angle of handlebar 18 relative to the arm 16 is adjusted.

In a second aspect, the foldable stroller, as shown in FIGS. 1, 2A, 2B, 3A and 3B, includes a reclining seat back 20 having an improved reclining mechanism 100 mounted thereto. The reclining mechanism 100 includes a casing 102, a wheel 104, a spring 106, a washer 108, a release mechanism 110 and two cables 112. The cables 112 have a first end 114 connected to the arms 16 and a second end 116 connected to the wheel 104. The wheel 104 may include two sets of rails 118, 120 for receiving the two cables 112 as they wrap around the wheel 104 and a recess 122 for receiving the spring 106. The release mechanism 110 may include a post 124 on which the wheel 104 may be mounted. The post 124 may include a slot 126 (see FIG. 3A) for receiving a bent portion 128 of the spring 106. The bent portion 128 of the spring 106 may be fixedly connected to the slot 126 and the free end of the spring 106 may be connected to the wheel 104 such that as the wheel 104 rotates about the post 124, energy is stored in the spring 106 for urging the wheel 104 to its initial position.

As shown in FIG. 3B, the release mechanism 110 may include a plurality of teeth 130 mounted on the wheel 104, two buttons 132 having teeth 134 for engaging the teeth 130 and a spring 136 for urging the teeth 134 of buttons 132 into engagement with teeth 130 on the wheel 104 for preventing rotation of the wheel 104 relative to the casing 102. When the buttons 132 are depressed, the teeth 134 disengage the teeth 130 thereby allowing the wheel 104 to rotate relative to the casing 102. As the wheel 104 rotates from its initial position, the tension in the spring 106 increases such that the wheel 104 is urged to its initial position. However, when the buttons 132 are released, the teeth 134 engage the teeth 130, thereby fixing the wheel in a specific position relative to the initial position.

Accordingly, as the wheel 104 rotates, as described above, the cable either extends from or retracts into the recline mechanism 100, resulting in either upward or downward pivotal movement, respectively, of the seat back 20 relative to the arms 16 of the stroller 10.

Figure 2B:
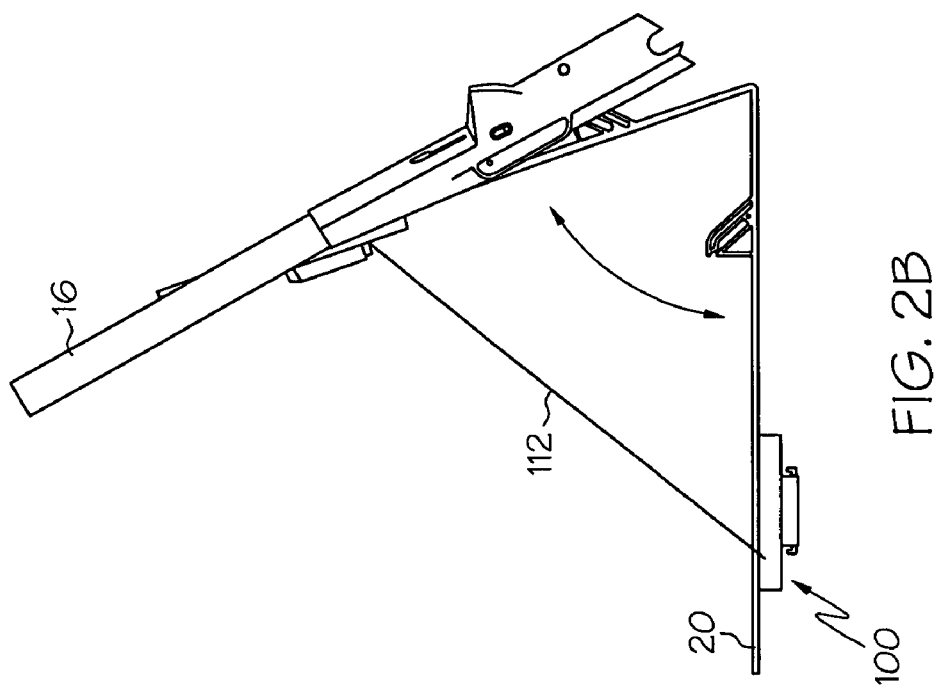
FIG. 2B is a side elevational view of the seat back portion of FIG. 2A.
Figure 2A:
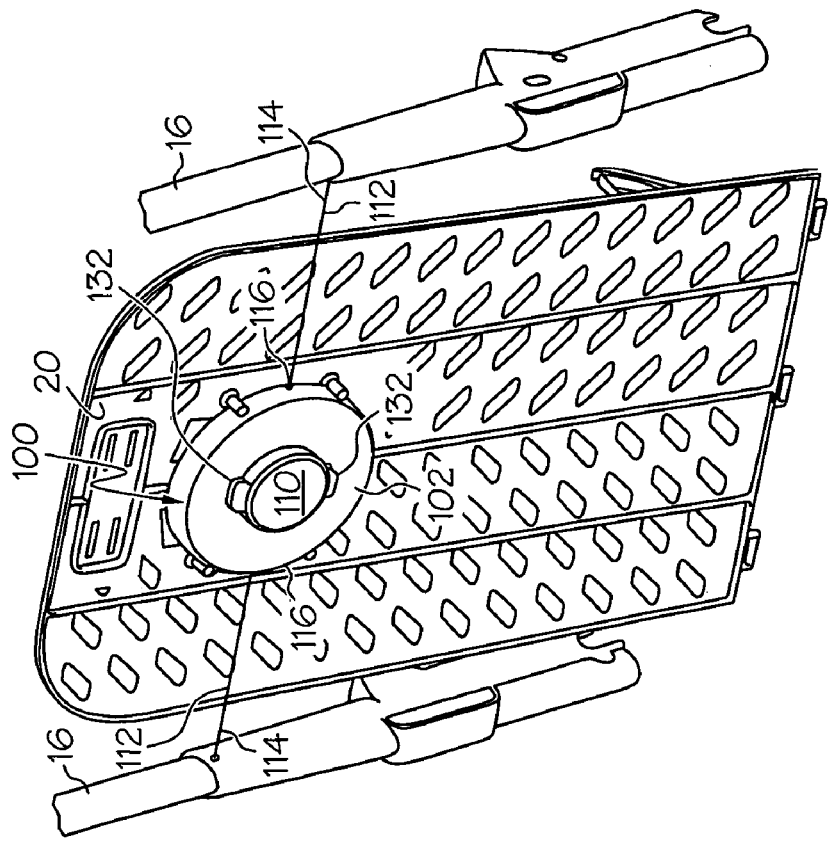
FIG. 2A is a rear perspective view of a seat back portion of the foldable stroller of FIG. 1.

When the seat back 20 is in a lower or reclined position, as shown in FIG. 2B, the bias of the spring 106 urges the wheel 104 to the initial position such that, when the buttons 132 are depressed, the cables 106 wrap around the wheel 104 (into the associated rails 118, 120) and shorten the cables 106, thereby raising the seat back 20 to a greater incline.

In one aspect, the wheel 112 may have a diameter specifically selected such that the circumference of the wheel 104 corresponds to the length of cable 106 necessary to recline the seat back 20 from the fully inclined position (see FIG. 2A) to the fully declined position (see FIG. 2B) in one 360° rotation of the wheel 104.

Figure 9B:
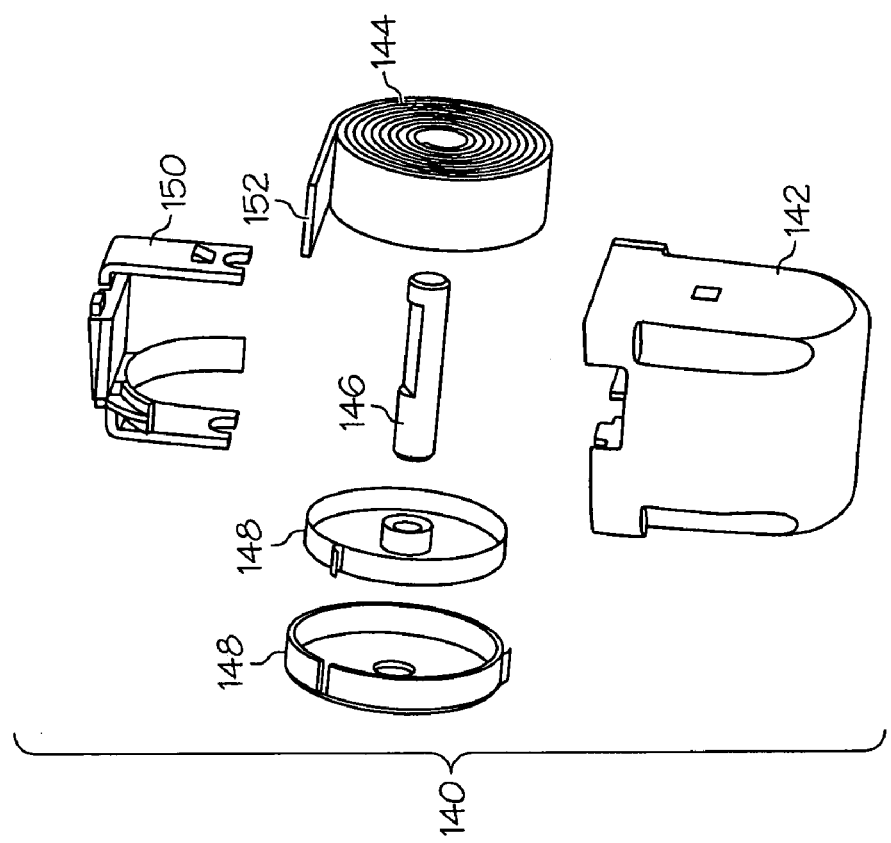
FIG. 9B is an exploded, perspective view of the seatbelt retractor of FIG. 9A.
Figure 9A:
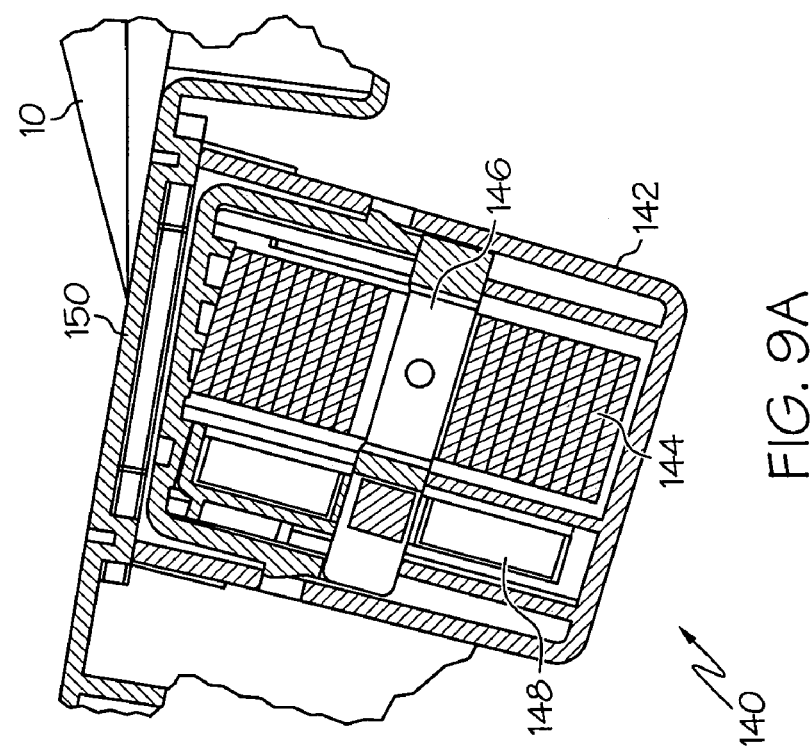
FIG. 9A is a side elevational view, in cross section, of a seatbelt retractor of the foldable stroller of FIG. 1.

In a third aspect, as shown in FIGS. 9A and 9B, the foldable stroller may include a seatbelt retractor, generally designated 140, for securing a car seat (not shown) to the stroller 10 using a seatbelt. The retractor 140 includes a casing 142, a spring 144, a rod 146, guide sleeves 148, a cover 150 and a seatbelt (not shown). Alternatively, the retractor 140 may be any like belt retractor capable of allowing a seat belt to be withdrawn when necessary and retracted when not in use.

The retractor 140 may be assembled by placing the rod 146 through the spring 144 and positioning the guide sleeves 148 beside the spring 144. The assembly may be positioned in the casing 142 and the cover 150 may secure the assembly within the casing 142. A free end 152 of the spring 144 may connected a seatbelt such that as the seatbelt is retracted from the retractor 140, the force of the spring 144 urges the seatbelt back into the casing 140.

The retractor 140 may be positioned anywhere on the stroller 10. In one aspect, the retractor 140 may be positioned beneath the seat 22 (see FIG. 1) on one side of the stroller 10 such that the seatbelt may extend from the retractor casing 142, up through an openings 154 in seat 22 and/or armrest 26A such that the seatbelt may be accessed at the armrest 26A. A buckle (not shown) may be positioned on the seatbelt and may prevent the seatbelt from fully retracting into the casing 142 (i.e., the buckle may be larger the opening 154).

The armrest 26B may include a receiving port 156 for receiving the buckle and securing the seatbelt in a locked position. Thus, an infant car seat may be positioned on the stroller and the seatbelt retractor 140 may secure the car seat to the stroller 10 via a seatbelt (not shown). When the buckle on the seatbelt is released from the receiving port 156, the bias of spring 144 urges the seatbelt back into the casing 142 for securely storing the seatbelt underneath the seat 22 of the stroller 10 when not in use.

In a fourth aspect, as shown in FIGS. 1, 10A, 10B and 10C, the stroller 10 may include an improved mechanism 160 for attaching a car seat to the stroller 10. The improved mechanism 160 is incorporated into or on the stroller seat 22 and may include two recesses 162 on a left 164 and right 166 side of the seat 22. Each recess 162 may include a first post 168 fixedly positioned in the recess 162, a second post 170 and a third post 172. The second and third posts 170, 172 are rotatably mounted in the recess 162 on a rod 174 such that the second and third posts 170, 172 may rotate from a disengaged position (shown in FIG. 10A), wherein the second and third posts 170, 172 are located entirely within the recess 162, to an engaged position (shown in FIG. 10C), wherein the second and third posts 170, 172 extend perpendicularly from the recess 162 and generally normal relative to the plane of the seat 22. The rod 174 may also connect the second and third posts 170, 172 on the left side 164 of the seat 22 to the second and third posts 170, 172 on the right side 166 of the seat 22 such that rotation of the second and third posts 170, 172 on the left side 164 corresponds to rotation of the second and third posts 170, 172 on the right side 166.

Figure 10A:
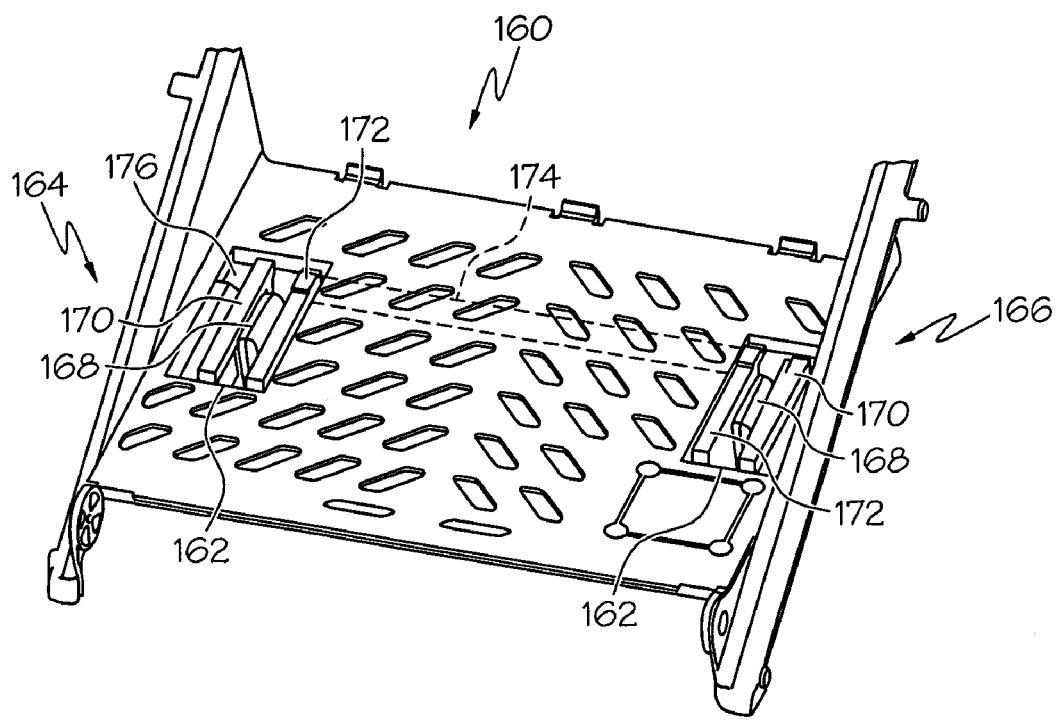
FIG. 10A is a front perspective view of a car seat attaching mechanism of the foldable stroller of FIG. 1, in a disengaged position.
Figure 10B:
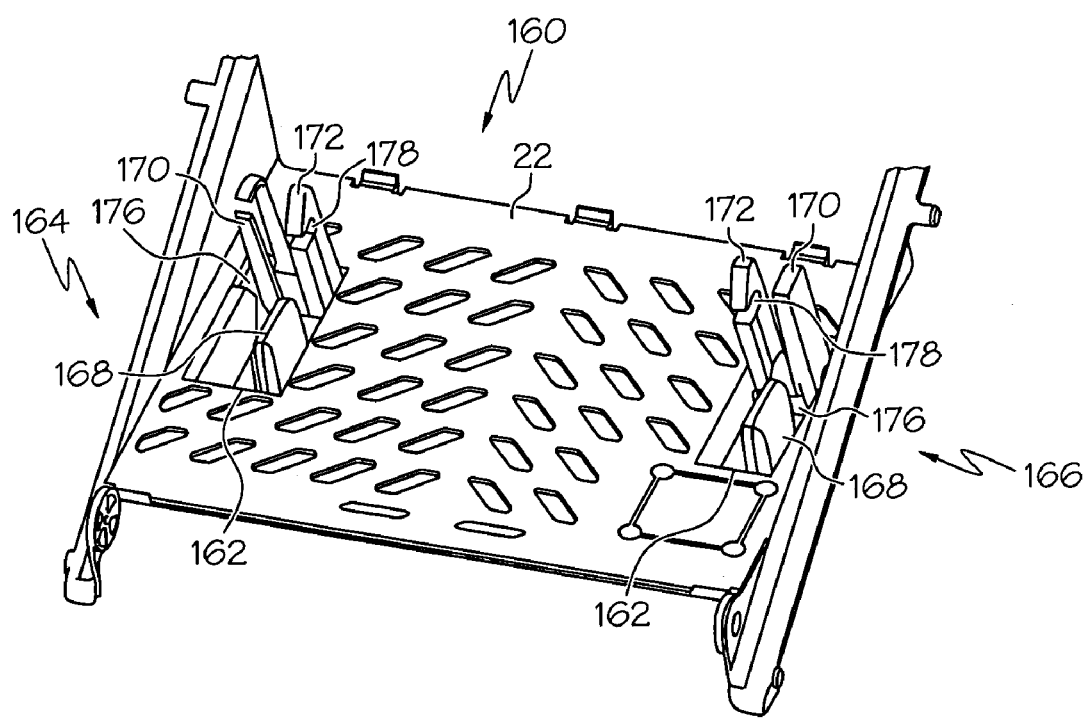
FIG. 10B is a front perspective view of the car seat attaching mechanism of FIG. 10A, in a partially engaged position.
Figure 10C:
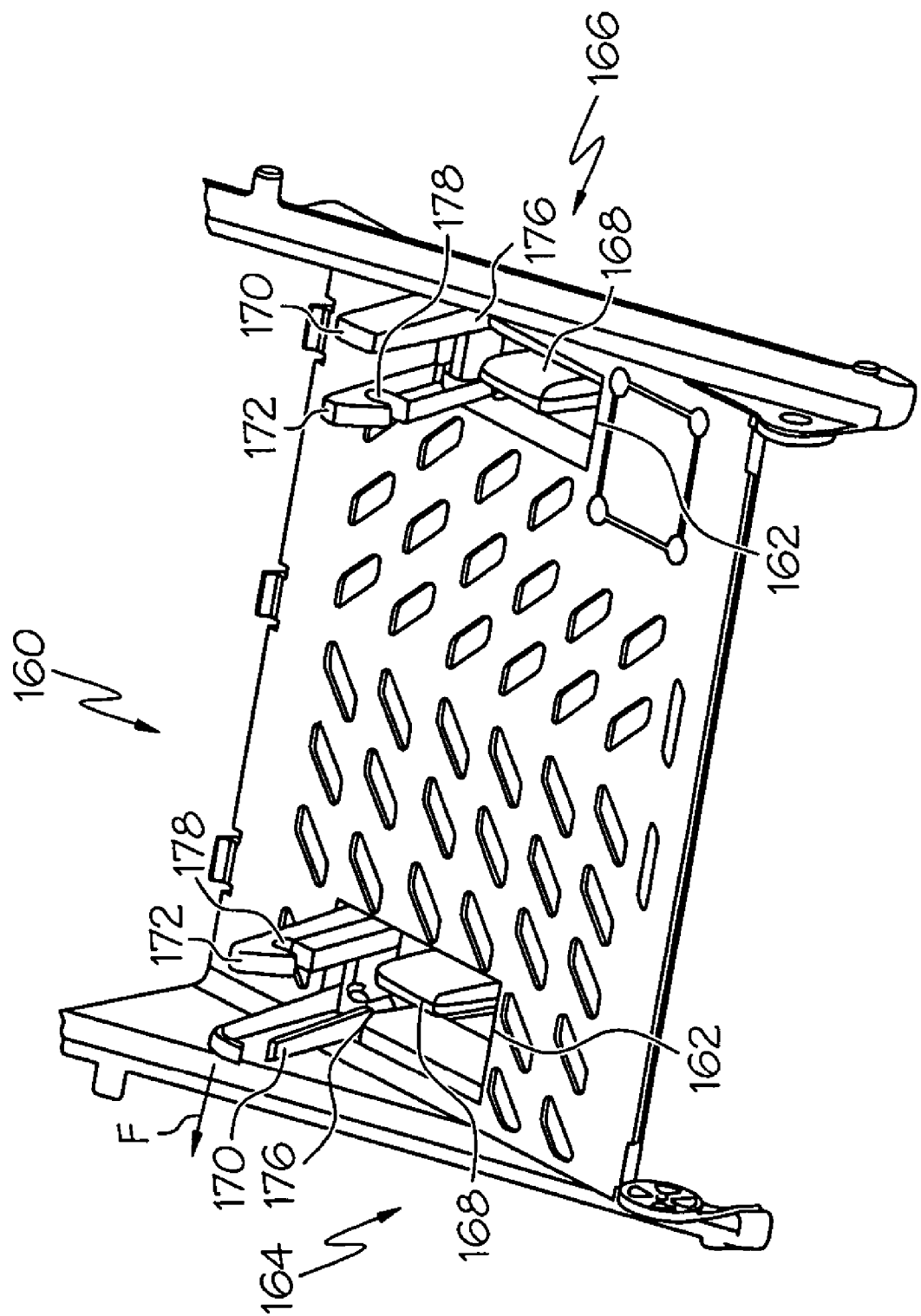
FIG. 10C is a front perspective view of the car seat attaching mechanism of FIG. 10A, in a fully engaged position.

The second and third posts 170, 172 may be spring loaded relative to one another(the spring is not shown) such that when they are rotated to a perpendicular (partially engaged) position as shown in FIG. 10B, the second post 170 is urged away from the third post 172 (in the direction shown by arrow F in FIG. 10C) and into a notch 176 in the seat 22, thereby locking the second and third posts 170, 172 in the perpendicular (fully engaged) position shown in FIG. 10C.

Therefore, the second and third posts 170, 172 may not return to the disengaged position (of FIG. 10A) unless the second post 170 is urged toward the third post 172, against the bias of the spring, such that the second post 170 is withdrawn from the notch 176.

The second post 170 may be generally rectangular in shape and the third post 172 may include a hook portion 178 for receiving and securing a car seat positioned on the seat 22 when the second and third posts 170, 172 are in the engaged position. A car seat used in combination with the improved mechanism 160 may include a notch or other means for engaging the hook portion 178 of the improved mechanism 160, thereby securing the car seat to the stroller 10. When the mechanism 160 is not in use, the posts 170, 172 may be stored in the disengaged position shown in FIG. 10A.

Figure 11B:
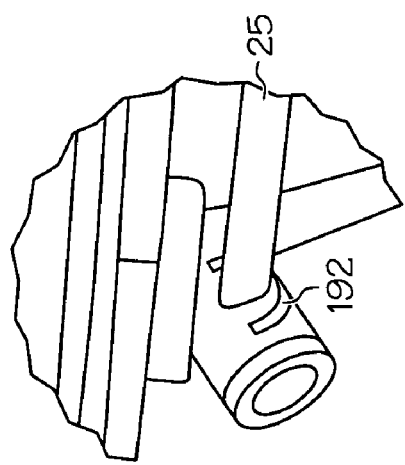
FIG. 11B is front perspective view of an attachment mechanism of the improved storage basket of FIG. 11A.
Figure 11A:
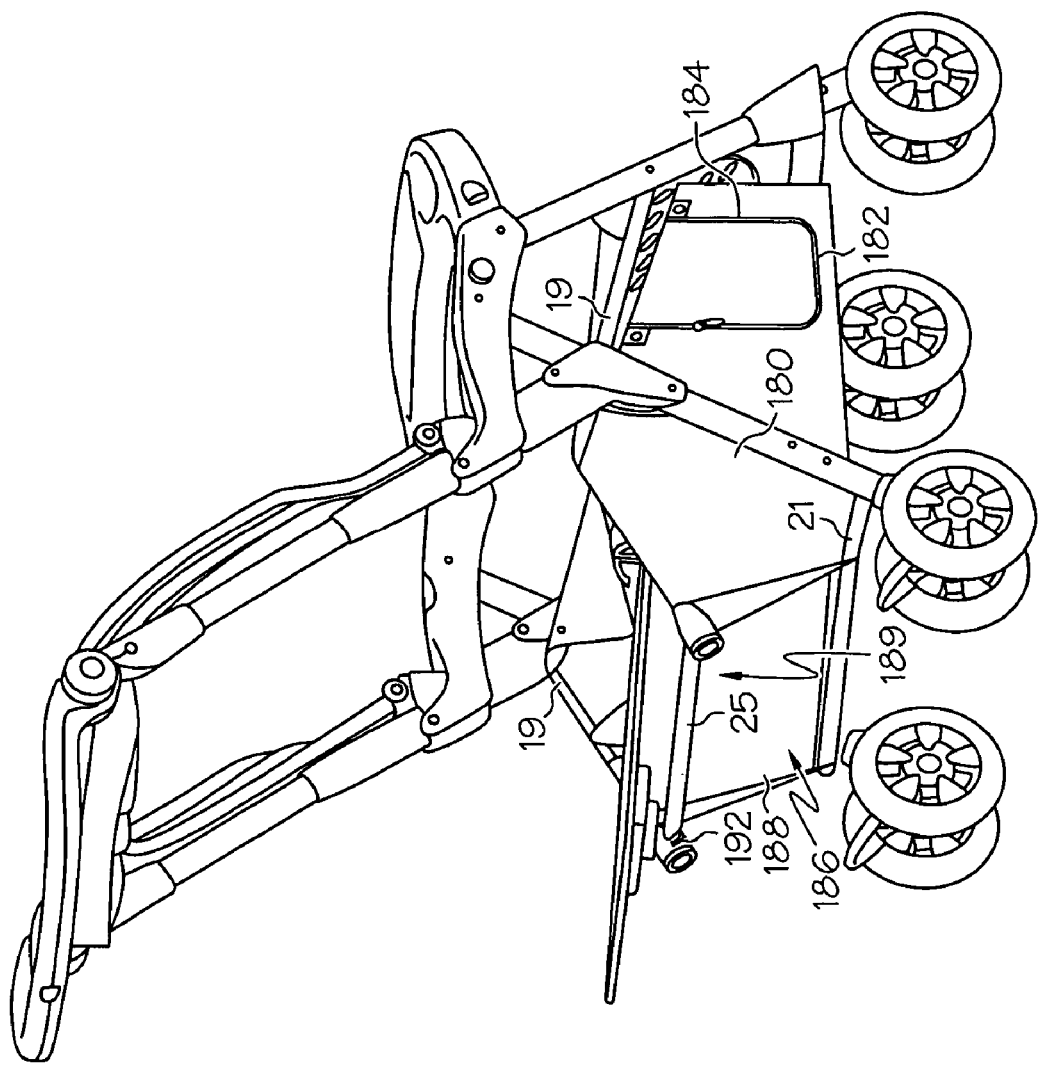
FIG. 11A is a side perspective view of the foldable stroller of FIG. 1 including an improved storage basket.

In a fifth aspect, shown in FIGS. 11A and 11B, the stroller 10 may include a storage basket 180 suspended from the support bars 19 of the stroller. The basket 180 may include a side opening 182 having a zipper closure 184 and a rear opening 186 having a flap 188. The flap 188 may extend beneath the lower cross bar 21 and may have an upper portion 189 connected to the upper cross bar 25.

The upper cross bar 25 may be connected to the support bars 19 by engaging U-shaped notches 192 in each of the support bars 19, as shown in FIG. 11B. Thus, the upper cross bar 25, which rests in U-shaped notches 192 at each end, may be easily disconnected from the support bars 19 by lifting the upper cross bar 25 out of the U-shaped notches 192, thereby allowing access to the rear opening 186. The rear opening 186 may then be closed by lifting the upper cross bar 25, and corresponding flap 188, over the support bars 19 and inserting the ends of the upper cross bar 25 into the U-shaped notches 192.

Figure 12A:
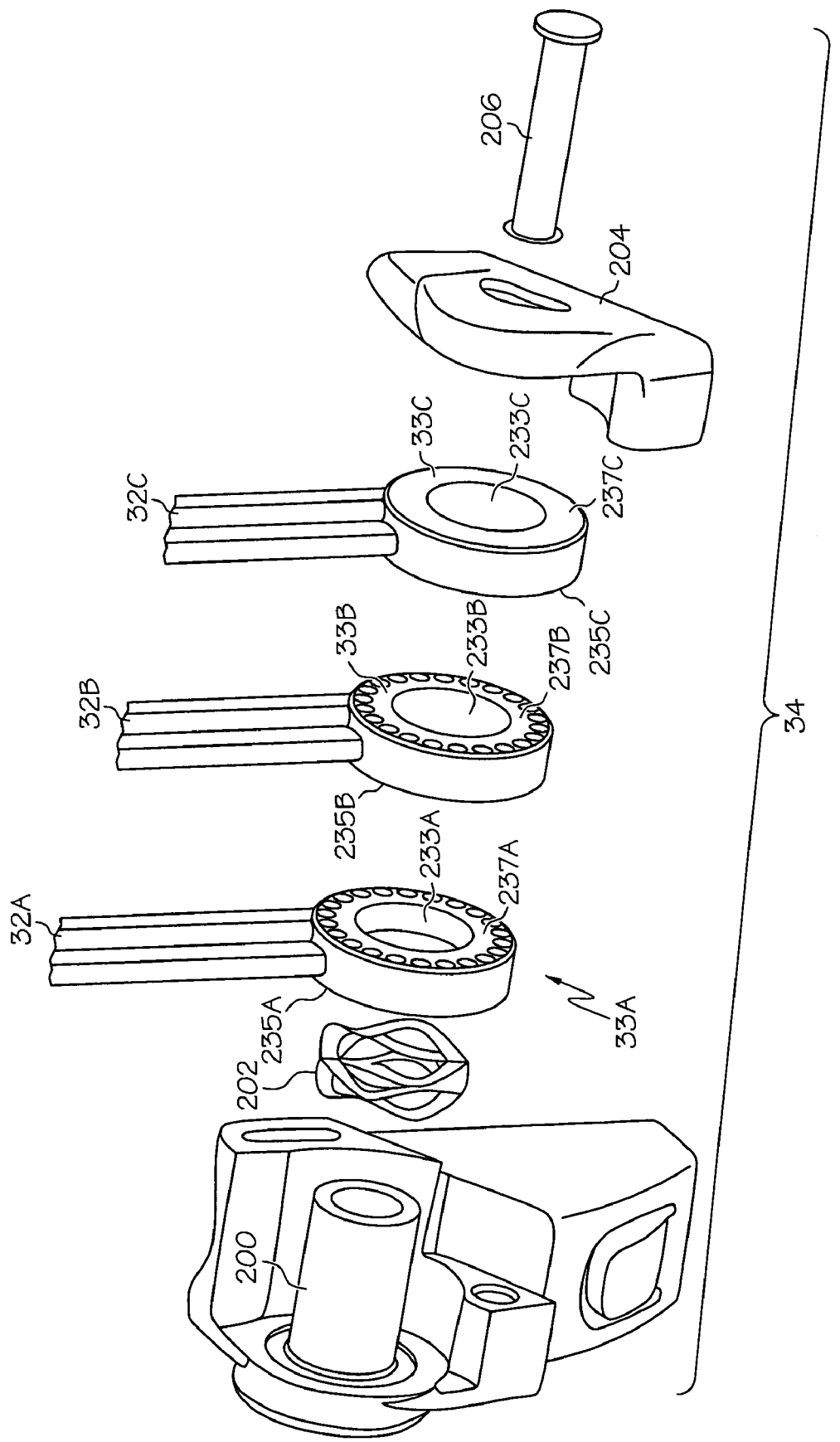
FIG. 12A is an exploded, perspective view of a canopy joint assembly of the foldable stroller of FIG. 1.
Figure 12B:
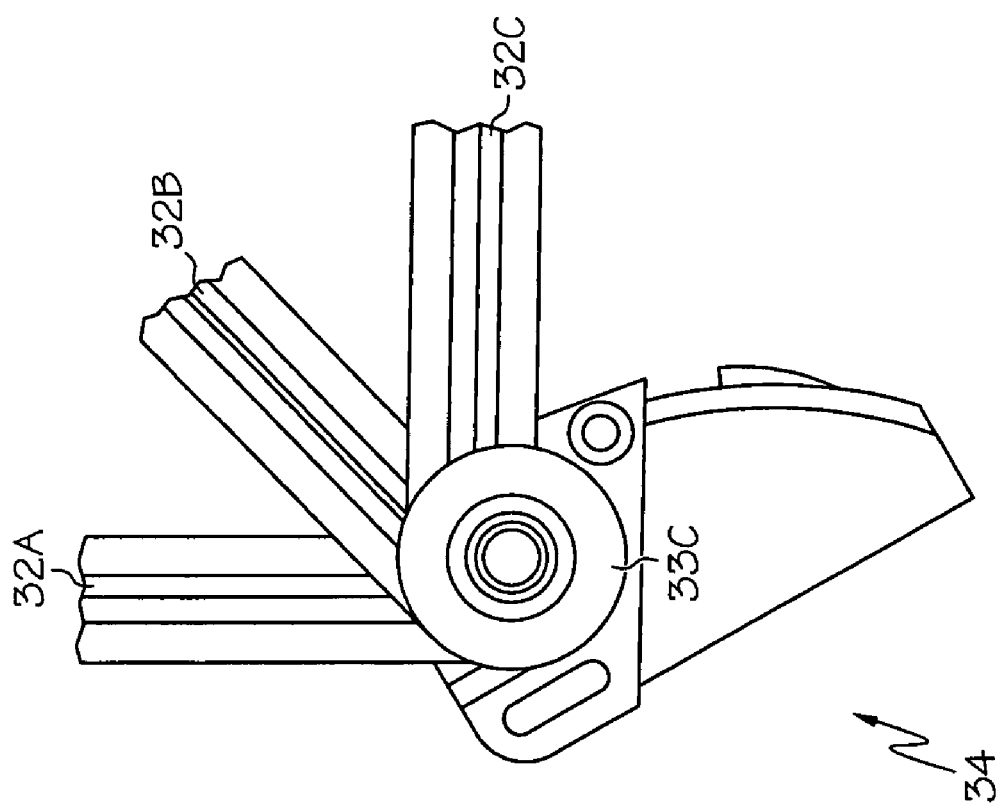
FIG. 12B is a side elevational view of the canopy joint assembly of FIG. 12A.
Figure 13A:
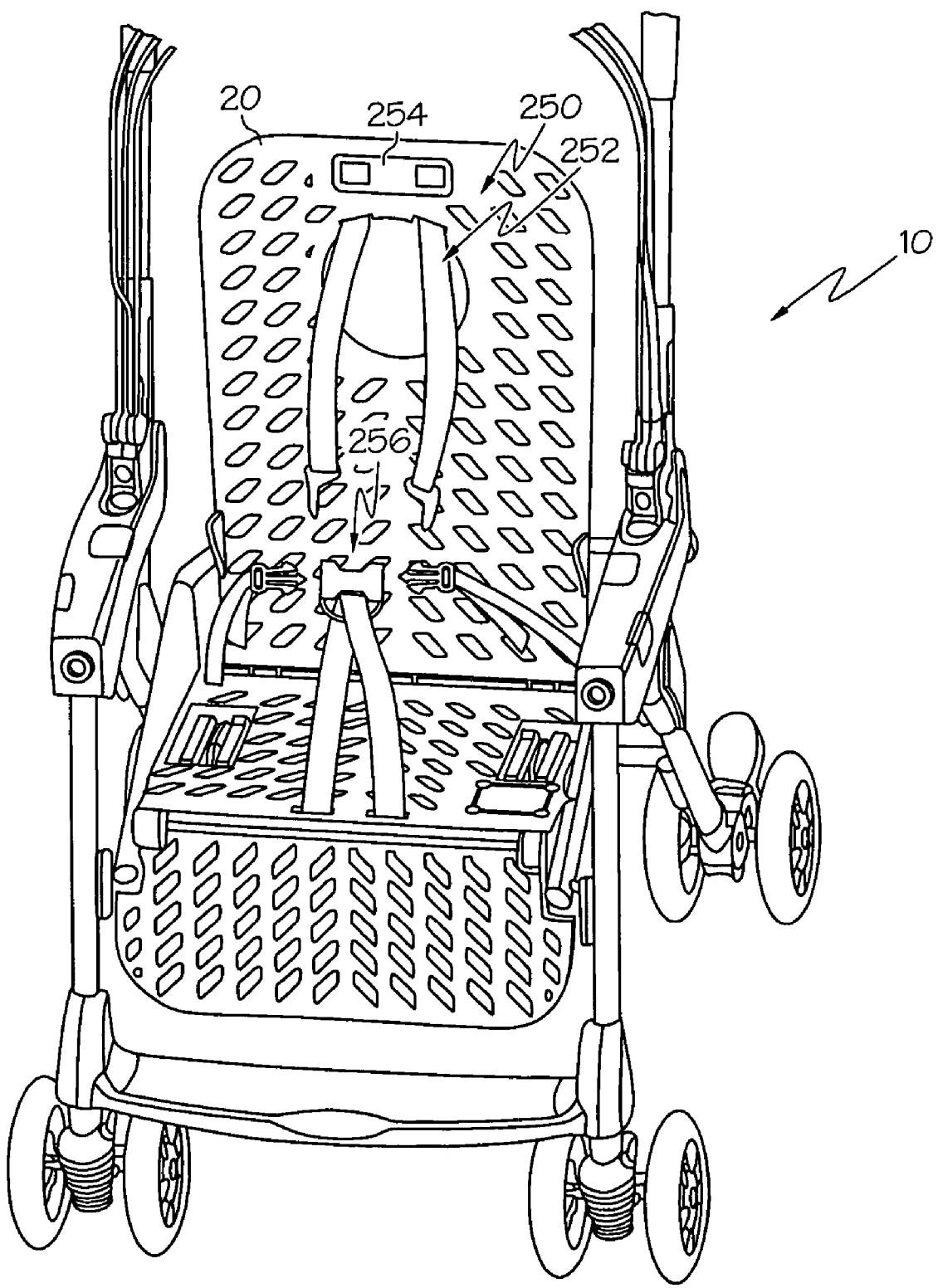
FIG. 13A is a front perspective view of the foldable stroller of FIG. 1 including a reversible harness assembly in a first position.
Figure 13B:
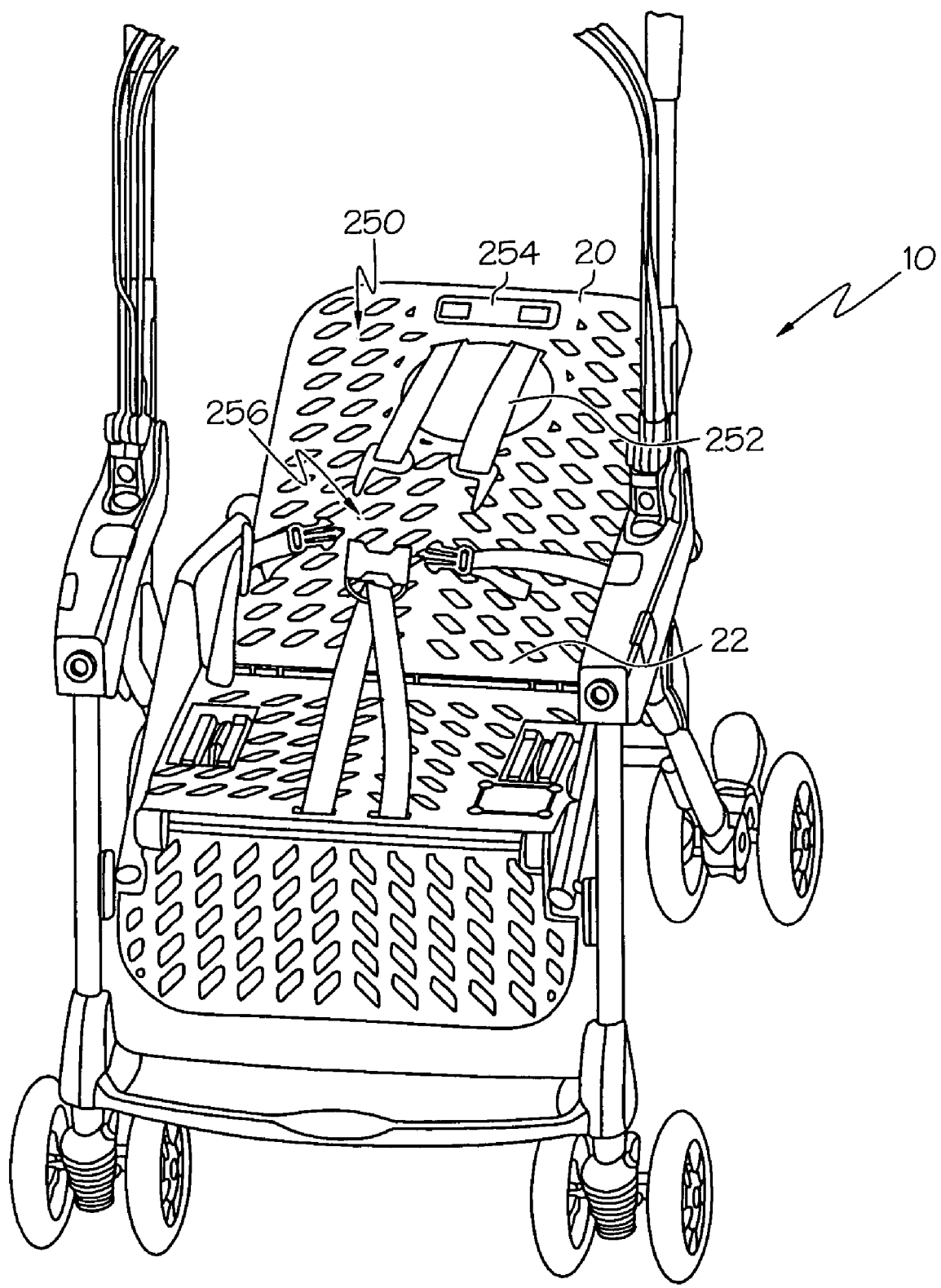
FIG. 13B is a front perspective view of the foldable stroller of FIG. 13A with the reversible harness assembly in a second position.

In a sixth aspect, shown in FIGS. 1, 12A and 12B, the stroller 10 may include canopy hoops 32A, 32B and 32C for positioning a canopy (not shown) over the seating portion of the stroller 10. The canopy hoops 32A, 32B and 32C may be attached to the arms 16 of the stroller 10 by canopy hoop joints 34, as shown in FIG. 1.

Each canopy hoop 32A, 32B, 32C may include a donut-shaped attachment portion 33A, 33B, 33C at each end. For example, canopy hoop 32A may include two donut-shaped attachment portions 33A at each end of the canopy hoop 32A. Attachment portion 33A may include a recess 233A, a first flush surface 235A and a second textured surface 237A, attachment portion 33B may include a recess 233B, a first textured surface 235B and a second textured surface 237B, and attachment portion 33C may include a recess 233C, a first textured surface 235C and a second flush surface 237C. The textured surfaces 237A, 235B, 237B, 235C may include a number of bumps positioned on the surfaces such that when the attachment portions are assembled, as shown in FIG. 12A, the bumps on the textured surfaces contact the other bumps on the textured surfaces while the flush surfaces extend outwardly, thereby limiting rotation of the hoops relative to one another by providing a ratcheting action. The bumps may be generally semi-spherical in shape or may have any shape sufficient to provide a ratcheting action (i.e., a bump on one surface is positioned between two bumps on another surface, thereby restricting relative movement of the two surfaces).

Joints 34 may be fixedly attached to the arms 16 of the stroller 10 and may include a post 200, a spring 202, a washer 204 and a securing pin 206. The joint 34 may be assembled by placing the spring 202 over the post, then sequentially placing the first attachment portion 33A, the second attachment portion 33B and the third attachment portion 33C over the post and securing them in position with the washer 204 and securing pin 206, as shown in FIG. 12A. The textured surfaces allow the hoops to stay in a fixed position with respect to the other hoops, while allowing the position of the hoops to be easily adjusted by overcoming the force of the spring 202.

In a seventh aspect, as shown in FIGS. 1, 13A, 13B and 14, the stroller 10 may include an adjustable harness 250 for securing infants and children to the stroller 10 in various positions. The adjustable harness 250 may include a strap (or harness) 252, a living hinge 254 and a buckle assembly 256.

Figure 14:
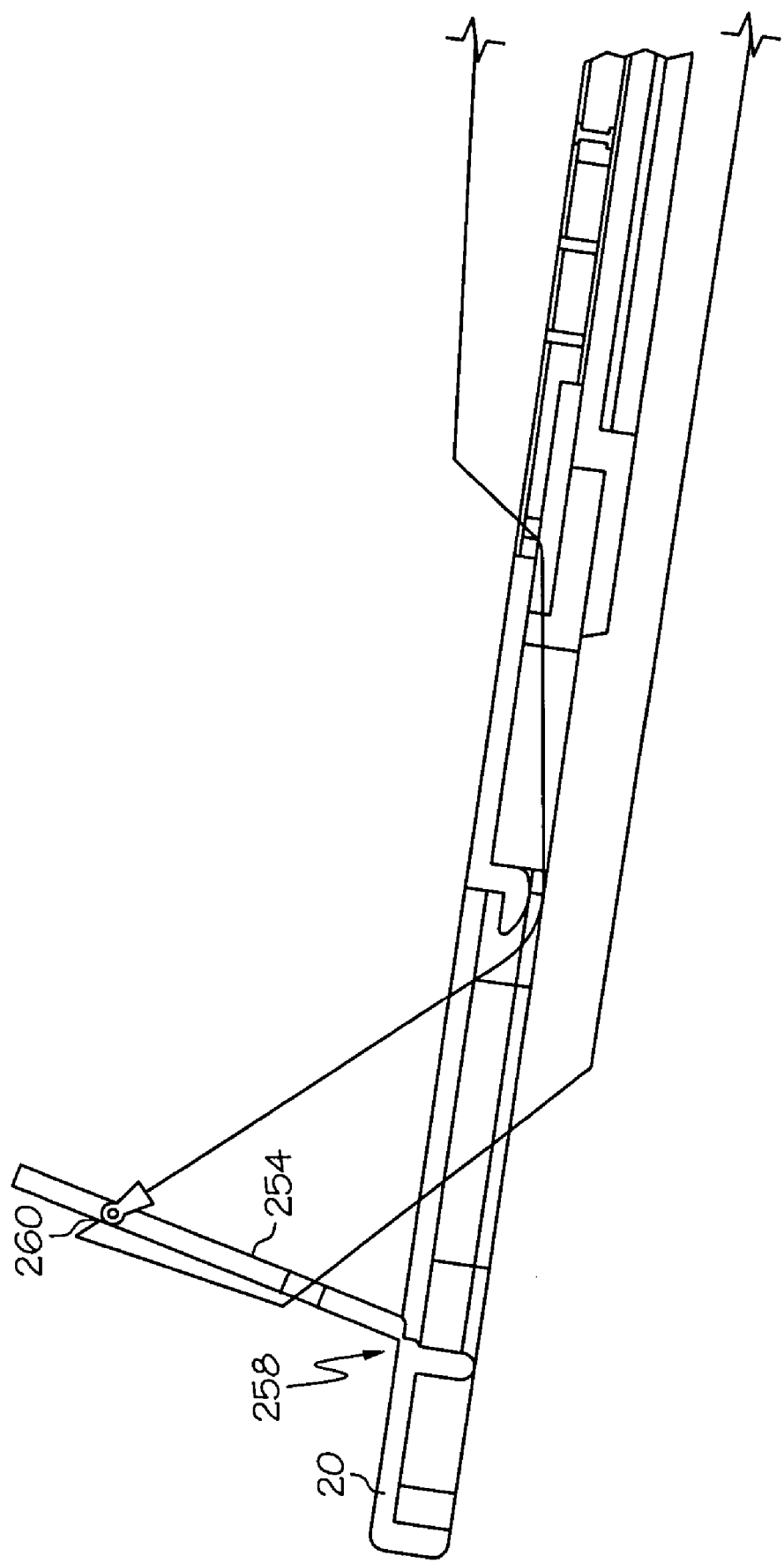
FIG. 14 is a side elevational view of the reversible harness assembly of FIGS. 13A and 13B.

The living hinge 254 may be rotatably connected to the seat back 20 by a hinge 258, as shown in FIG. 14, and may include an angled recess 260 through which the strap 252 is received. When the living hinge 254 is in the open position (shown in FIG. 14), the strap 252 may easily move through the recess to be adjusted to a desired length. However, when the living hinge 254 is in the closed position (shown in FIGS. 13A and 13B) the living hinge 254 is flat against the seat back 20 and therefore the sharp angle of the angled recess 260 prevents the strap from moving through the living hinge 254 such that the strap is fixed in a certain position. Accordingly, the strap 252 may be adjusted to accommodate the various positions of the seat back 20 relative to the seat 22.

Although the foldable stroller is shown and described with respect to certain aspects, it is obvious that various modifications will become apparent to those skilled in the art upon reading the specification and the appended claims. The foldable stroller includes all such modifications and is limited only by the scope of the claims.

What is claimed is:

1. A stroller comprising:
   two rear legs;
   two arms, wherein a first one of said arms is pivotally connected to a first one of said rear legs by a first latch mechanism and a second one of said arms is pivotally connected to a second one of said rear legs by a second latch mechanism, each of said latch mechanisms being adapted to releasably lock an associated one of said arms in a position with respect to an associated one of said rear legs;
   a handlebar portion having a first end and a second end, wherein said first end of said handlebar portion is pivotally connected to a first one of said arms and said second end of said handlebar portion is pivotally connected to a second one of said arms;
   a single release mechanism positioned on said handlebar portion, wherein said single release mechanism is connected to each of said first and second latch mechanisms and is adapted to release said first and second latch mechanisms to allow pivotal movement of said arms relative to said rear legs; and
   at least one connecting plate for connecting one of said arms to an associated one of said rear legs, wherein said connecting plate includes a spring loaded detent adapted to engage a recess.

2. The stroller of claim 1 wherein said single release mechanism is a single spring-loaded button positioned on said handlebar portion.

3. The stroller of claim 2 wherein said single spring-loaded button is positioned generally centrally on said handlebar portion.

4. The stroller of claim 1 further comprising two cables, wherein a first one of said cables includes a first end connected to said first latch mechanism and a second end connected to said single release mechanism and a second one of said cables includes a first end connected to said second latch mechanism and a second end connected to said single release mechanism.

5. The stroller of claim 1 wherein each of said latch mechanisms includes a plunger slidably received within a distal end of an associated one of said arms.

6. The stroller of claim 5 further comprising a stop positioned on each of said rear legs, wherein said stop is adapted to be engaged by an associated one of said plungers.

7. The stroller of claim 1 further comprising a handlebar joint for pivotally connecting said first end of said handlebar portion to a first one of said arms, wherein said handlebar joint includes push button assembly adapted to allow rotation of said handlebar potion relative to said arms.

8. A stroller comprising:
two arms;
a seat back portion positioned between said arms; and
a reclining mechanism connected to said seat back portion, wherein said reclining mechanism includes at least one spring-loaded cable extending therefrom and fixedly connected to an associated one of said arms, wherein said cable is adapted to retractably extend from said reclining mechanism to adjust an angle of said seat back relative to said arms, wherein said recline mechanism includes a wheel having two cables connected thereto, wherein a first one of said cables is fixedly connected to a first one of said arms and a second one of said cable is connected to a second one of said arms.

9. The stroller of claim 8 wherein said wheel is rotatably mounted on a post and is spring-biased to an initial position.

10. The stroller of claim 9 wherein said initial position is a not-reclined position.

11. The stroller of claim 8 wherein said recline mechanism includes a release mechanism.

* * * * *

UNITED STATES PATENT AND TRADEMARK OFFICE
CERTIFICATE OF CORRECTION

PATENT NO. : 7,278,652 B2　　　　　　　　　　　　　　　　　　　　　Page 1 of 1
APPLICATION NO. : 11/120043
DATED : October 9, 2007
INVENTOR(S) : John Riedl et al.

It is certified that error appears in the above-identified patent and that said Letters Patent is hereby corrected as shown below:

On Title Page Item (76) Inventors:

Second Inventor's first name Change "John", to -- Jay --.

Column 9

Line 3 – Change "potion" to -- portion --.

Signed and Sealed this

Eighteenth Day of December, 2007

JON W. DUDAS
*Director of the United States Patent and Trademark Office*